United States Patent [19]
Bannister et al.

[11] Patent Number: 6,145,032
[45] Date of Patent: Nov. 7, 2000

[54] SYSTEM FOR RECIRCULATION OF COMMUNICATION TRANSACTIONS IN DATA PROCESSING IN THE EVENT OF COMMUNICATION STALL

[75] Inventors: John Peyton Bannister, Austin; Gary Dale Carpenter, Pflugerville; David Brian Glasco, Austin, all of Tex.

[73] Assignee: International Business Machines Corporation, Armonk, N.Y.

[21] Appl. No.: 09/157,894

[22] Filed: Sep. 21, 1998

[51] Int. Cl.$^7$ .................................................. G06F 3/00
[52] U.S. Cl. .................. 710/52; 710/20; 710/21; 710/31; 710/32; 710/36; 710/53; 710/54; 710/55; 710/56; 714/18; 714/42; 714/51; 370/414
[58] Field of Search ............................ 710/20–36, 52–74; 714/18, 42–54; 370/414

[56] References Cited

U.S. PATENT DOCUMENTS

| | | | |
|---|---|---|---|
| 4,860,244 | 8/1989 | Bruckert et al. | 711/219 |
| 5,130,977 | 7/1992 | May et al. | 370/422 |
| 5,416,769 | 5/1995 | Karol | 370/414 |
| 5,581,790 | 12/1996 | Sefidvash | 710/34 |
| 5,646,558 | 7/1997 | Jamshidi | 326/106 |
| 5,664,122 | 9/1997 | Rabe et al. | 710/128 |
| 5,673,413 | 9/1997 | Deshpande et al. | 711/141 |
| 5,760,784 | 6/1998 | Bullis et al. | 345/439 |
| 5,771,356 | 6/1998 | Leger et al. | 709/233 |
| 5,838,677 | 11/1998 | Kozaki et al. | 370/389 |
| 5,884,046 | 3/1999 | Antonov | 709/238 |
| 5,941,983 | 8/1999 | Gupta et al. | 712/214 |
| 5,944,802 | 8/1999 | Bello et al. | 710/52 |

*Primary Examiner*—John A. Follansbee
*Assistant Examiner*—Nabil El-Hady
*Attorney, Agent, or Firm*—Casimer K. Salys; Felsman, Bradley, Vaden, Gunter & Dillon, LLP

[57] ABSTRACT

A data recirculation apparatus for a data processing system includes at least one output buffer from which data are output onto an interconnect, a plurality of input storage areas from which data are selected for storage within the output buffer, and selection logic that selects data from the plurality of input storage areas for storage within the output buffer. In addition, the data recirculation apparatus includes buffer control logic that, in response to a determination that a particular datum has stalled in the output buffer, causes the particular datum to be removed from the output buffer and stored in one of the plurality of input storage areas. In one embodiment, the recirculated data has a dedicated input storage area.

18 Claims, 3 Drawing Sheets

SYSTEM FOR RECIRCULATION OF COMMUNICATION TRANSACTIONS IN DATA PROCESSING IN THE EVENT OF COMMUNICATION STALL

BACKGROUND OF THE INVENTION

1. Technical Field

The present invention relates in general to a method and system for data processing and, in particular, to method and apparatus for processing communication transactions in a data processing system. Still more particularly, the present invention relates to a method and apparatus for recirculating communication transactions in a data processing system in order to reduce the performance penalty associated with communication stalls.

2. Description of the Related Art

In shared memory multiprocessor (MP) computer systems that include two or more processing nodes, inter-node communication is typically handled by a bridge within each node. Such bridges may receive communication packets from other processing nodes via a node interconnect, provide reply packets to the other processing nodes via the node interconnect, and source and receive packets on a processing node's local interconnect. Because certain (e.g., shared bus) implementations of shared memory MP computer systems require that packets received via the node interconnect be delivered to the local interconnect sequentially, each bridge may include a buffer to temporarily store packets until the packets can be sourced on the associated processing node's local interconnect.

Of course, in a practical implementation of a shared memory MP computer systems, the buffers within the processing nodes' bridges are constrained to some limited size. Once a buffer is full, the bridge must either source a packet on the local interconnect to create an empty buffer entry or the bridge must suspend receipt of communication packets from other processing nodes (i.e., stall). Such stalls can be due to the current inability of a target processing node to process a packet stored in the buffer and/or delays attributable to the packet processing logic itself. In either case, communication stalls have a deleterious effect on MP computer system performance since the stall delays the transmission of all subsequent packets to the stalled processing node.

In view of the foregoing it would be desirable and useful to provide a method and apparatus that decrease the performance penalty incurred in the event of a communication stall in a computer system.

SUMMARY OF THE INVENTION

In accordance with the present invention, a data recirculation apparatus is utilized to minimize the performance penalty associated with communication stalls in a data processing system. The data recirculation apparatus includes at least one output buffer from which data are output onto an interconnect, a plurality of input storage areas from which data are selected for storage within the output buffer, and selection logic that selects data from the plurality of input storage areas for storage within the output buffer. In addition, the data recirculation apparatus includes buffer control logic that, in response to a determination that a particular datum has stalled in the output buffer, causes the particular datum to be removed from the output buffer and stored in one of the plurality of input storage areas. In one embodiment, the recirculated data have a dedicated input storage area.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
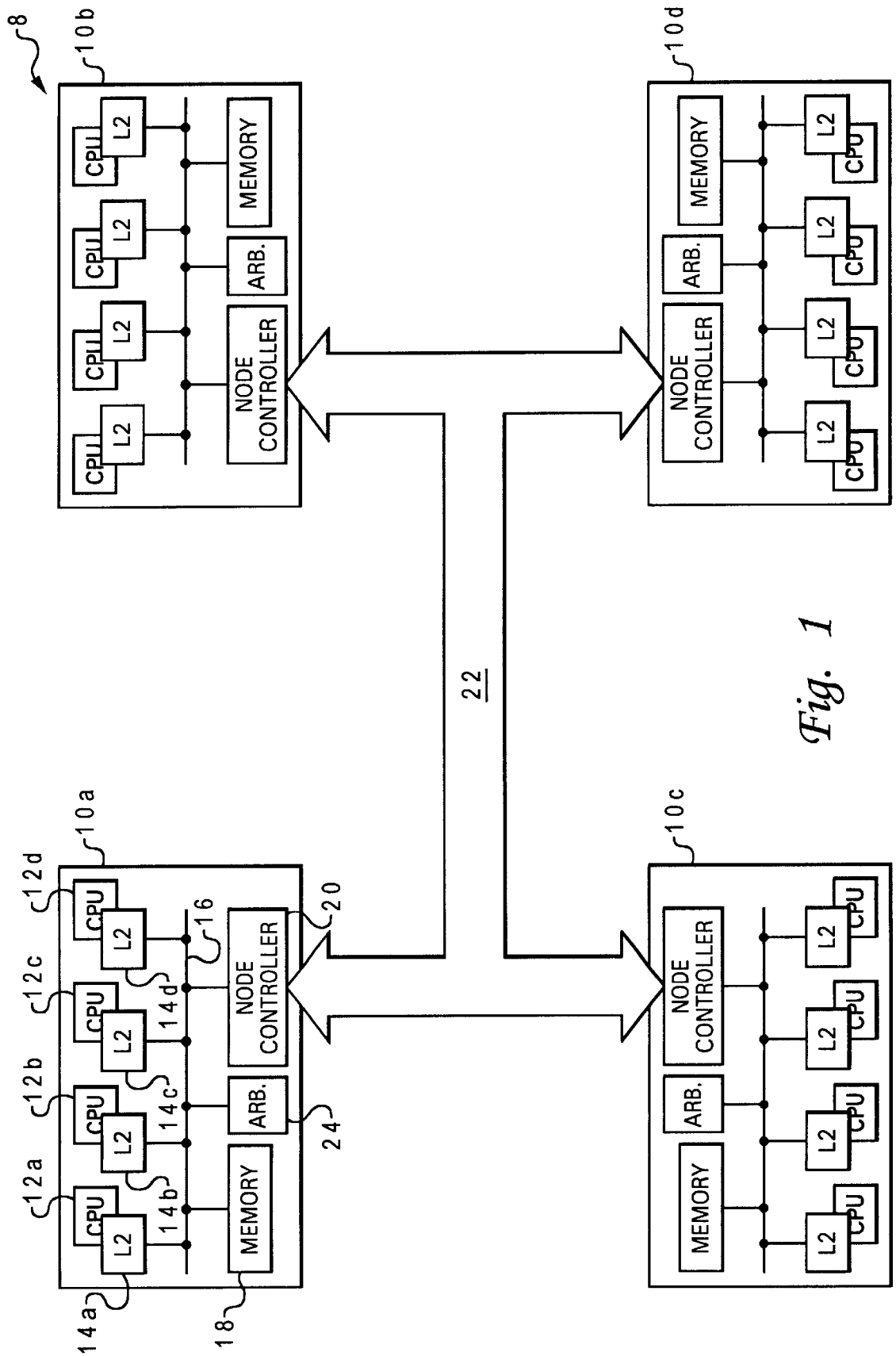
FIG. 1 depicts an illustrative embodiment of a computer system with which the present invention may advantageously be utilized.

The present invention is applicable to any data processing system. However, FIG. 1 depicts a specific exemplary embodiment of a shared memory multiprocessor (MP) computer system in which the present invention may advantageously be utilized. The depicted embodiment can be realized, for example, as a workstation, server, or mainframe computer.

As illustrated in FIG. 1, computer system 8 is a non-uniform memory access (NUMA) computer system that includes a number (N) of processing nodes 10a–10d, which are interconnected by node interconnect 22. Processing nodes 10a–10d each include at least one, and up to M, processors 12 and a shared system memory 18. In addition to the registers, instruction flow logic and execution units utilized to execute program instructions, each of processors 12a–12d also includes an on-chip level one (L1) cache (not illustrated), which together with a respective one of level two (L2) caches 14a–14d is utilized to stage data to the associated processor 12 from system memories 18. In other words, the L1 caches and L2 caches 14a–14d function as intermediate storage between the system memories 18 and processors 12 that temporarily buffer data that are likely to be accessed by the associated processor 12. Although L2 caches 14a–14d are illustrated in FIG. 1 as external to processors 12, it should be understood that L2 caches 14a–14d (as well as additional levels of cache) could alternatively be incorporated within the associated processor 12 to provide additional on-chip storage.

As shown, processing nodes 10a–10d further a respective node controller 20, which, together with system memory 18 and L2 caches 14a–14d, is coupled to local interconnect 16. Each node controller 20 serves as a local agent for remote processing nodes 10 by performing at least two functions. First, node controllers 20 snoop the associated local interconnect 16 and facilitate the transmission of local communication transactions to remote processing nodes 10. Second, node controllers 20 snoop communication transactions on node interconnect 22 and master relevant communication transactions on the associated local interconnect 16. Thus, node controllers 20 function as bridges between local interconnects 20 and node interconnect 22. Communication on each local interconnect 16 is controlled by an arbiter 24.

In the depicted illustrative embodiment, all of processors 12 in NUMA computer system 8 share a single physical memory space, meaning that each physical address is associated with only a single location in one of system memories 18. Thus, the overall contents of the system memory, which can generally be accessed by any processor 12 in NUMA computer system 8, can be viewed as partitioned between the four system memories 18. Because data stored within each system memory 18 can be requested, accessed, and modified by any processor 12 within NUMA computer system 8, NUMA computer system 8 preferably implements a cache coherency protocol (e.g., Modified, Exclusive, Shared, Invalid (MESI)) to maintain coherency both between caches in the same processing node and between caches in different processing nodes.

Local interconnects 16 and node interconnect 22 can each be implemented with any bus-based broadcast fabric, switch-based broadcast fabric, switch-based non-broadcast fabric, or hybrid interconnect architecture including both bus and switched-based components. Regardless of which interconnect architecture is employed, local interconnects 16 and node interconnect 22 preferably support split transactions, meaning that the timings of the address and data portions of communication transactions are independent. In order to permit identification of which address and data tenures belong to each communication transaction, the address and data packets that together form a transaction are preferably both marked with the same transaction tag.

Of course, NUMA computer system 8 can further include additional devices that are not necessary for an understanding of the present invention and are accordingly omitted in order to avoid obscuring the present invention. For example, each processing node 10 may also support I/O devices (e.g., a display device, keyboard, or graphical pointer), non-volatile storage for storing an operating system and application software, and serial and parallel ports for connection to networks or attached devices.

Figure 2:
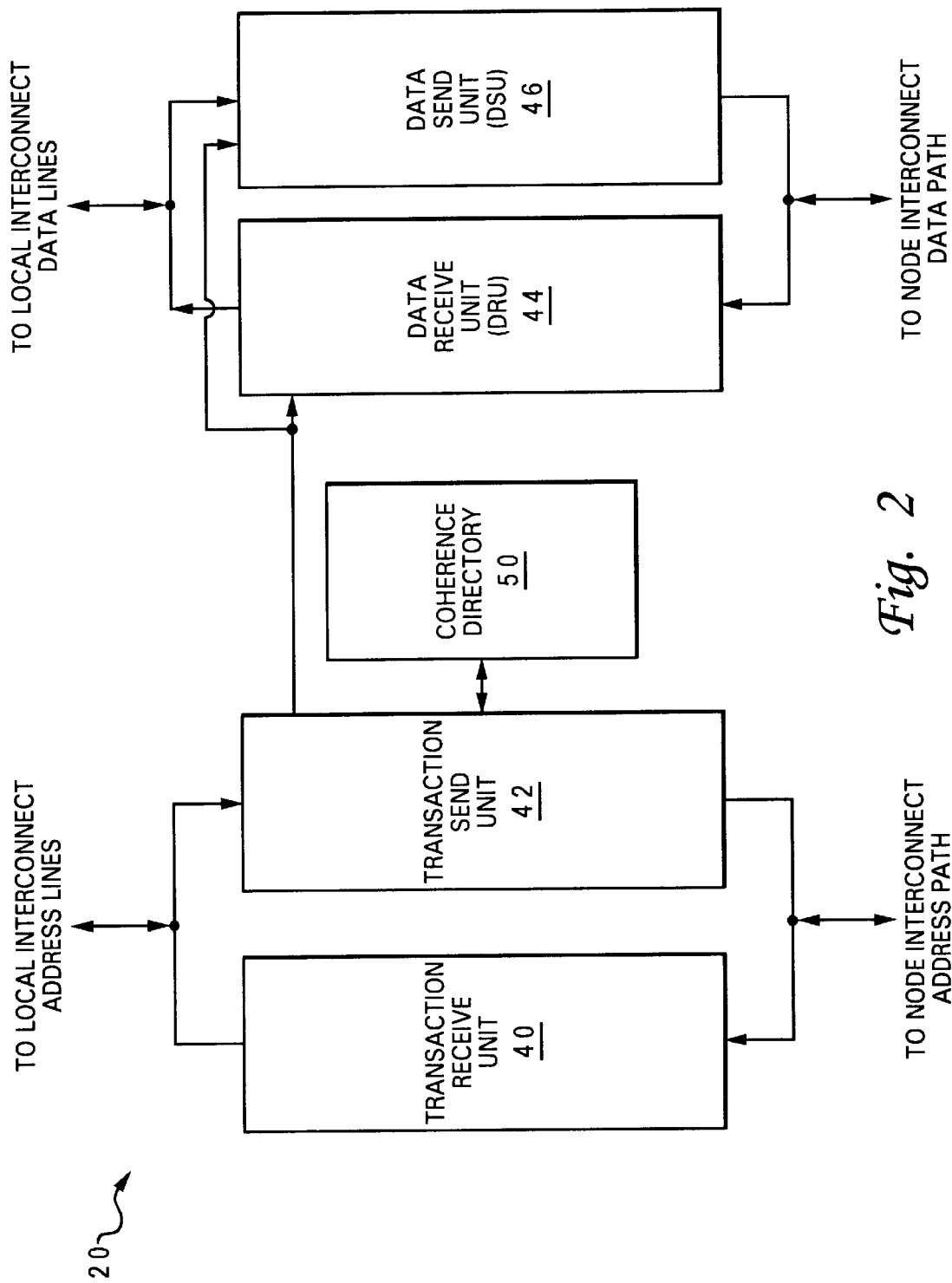
FIG. 2 is a more detailed block diagram of the node controller shown in FIG. 1.

Referring now to FIG. 2, there is illustrated a more detailed block diagram of a node controller 20 in computer system 8 of FIG. 1. As depicted, each node controller 20, which is coupled between a local interconnect 16 and node interconnect 22, includes a transaction receive unit 40, a transaction send unit 42, a data receive unit (DRU) 44, and a data send unit (DSU) 46. Transaction receive unit 40, transaction send unit 42, DRU 44 and DSU 46 can be implemented, for example, with field programmable gate arrays (FPGAs) or application specific integrated circuits (ASICs). As indicated, the address and data paths through node controller 20 are bifurcated, with address signals being processed by transaction receive unit 40 and transaction send unit 42 and data signals being processed by DSU 44 and DRU 46.

Transaction receive unit 40, which is so designated to indicate transaction flow off of node interconnect 22, is responsible for accepting transactions and responses from node interconnect 22, issuing received transactions on local interconnect 16, and forwarding responses to transaction send unit 42. Transaction send unit 42, which as indicated by its nomenclature is a conduit for transactions flowing onto node interconnect 22, interacts with transaction receive unit 40 to process memory request transactions and issues commands to DRU 44 and DSU 46 to control the bi-directional transfer of data between local interconnect 16 and the data portion of node interconnect 22. Transaction send unit 42 also implements the selected coherency protocol for node interconnect 22 and maintains coherence directory 50.

Coherence directory 50 stores indications of the system memory addresses of data (e.g., cache lines) checked out to caches in remote processing nodes for which the local processing node is the home node (i.e., the system memory 18 at the local processing node contains the data). The address indication for each datum is stored in association with an identifier of each processing node having a copy of the datum and the coherency status of the datum at each such processing node.

Figure 3:
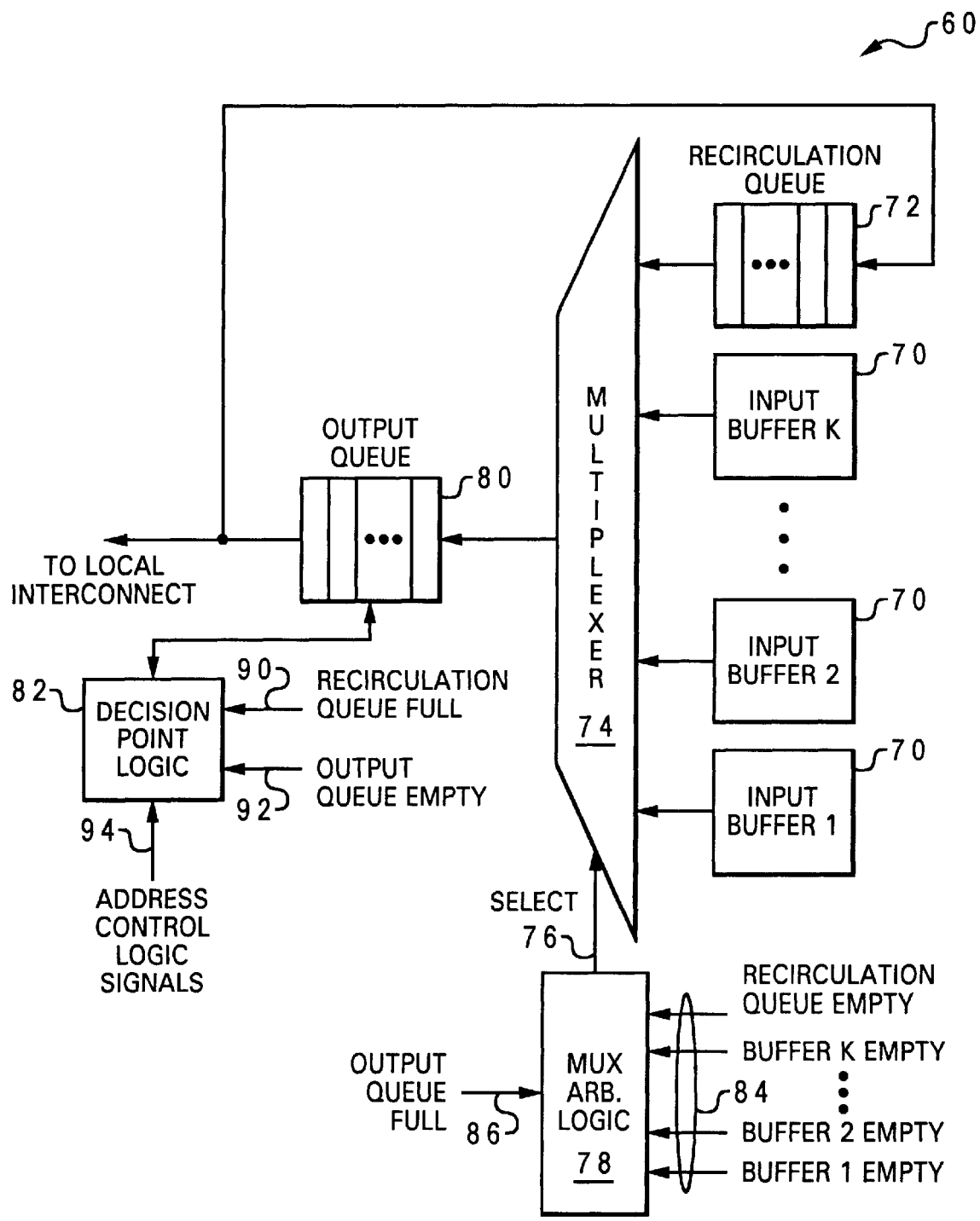
FIG. 3 depicts an illustrative embodiment of a data recirculation apparatus in accordance with the present invention.

With reference now to FIG. 3, there is depicted an exemplary embodiment of a data recirculation apparatus in accordance with the present invention, which may be implemented within DRU 44 of FIG. 2. The implementation of a data recirculation apparatus within DRU 44 is important because data packets may be received by DRU 44 in a different order than the associated transactions are received by TRU 40 or in a different order than the data packets are required to be presented on local interconnect 16 to ensure memory consistency. Without a way to re-order the data packets, data packets for which the associated transactions have not been received would cause the flow of transactions onto local interconnect 16 to stall or deadlock, thereby slowing overall system operation.

As shown in FIG. 3, data recirculation apparatus 60 has K+1 input storage areas, a multiplexer 74, and an output queue 80. The K+1 input storage areas include K input buffers 70 and one recirculation queue 72. Each of the K input buffers 70 provides a storage location into which data packets to be transmitted over local interconnect 16 can temporarily be stored by instances of data packet processing logic within DRU 44. As illustrated, each of input buffers 70 and recirculation queue 72 has an output connected to an input of multiplexer 74, which selects one of its input data packets as an output in response to a select signal 76 generated by mux arbitration logic 78. Mux arbitration logic 78 generates select signal 76 in response to a number of inputs, including empty signals 84 that indicate which, if any, of recirculation queue 72 and input buffers 70 are empty and a full signal 86 that indicates if output queue 80 is full. The arbitration algorithm implemented by mux arbitration logic 78 is implementation-dependent and may preferentially service a particular input storage area, such as recirculation queue 72, may preferentially service input storage areas based upon the amount of data packets stored, or may service each of the input storage areas with equal priority. Regardless of the arbitration algorithm that is implemented, mux arbitration logic 78 preferably never selects an input to multiplexer 74 provided by an empty input storage area (i.e., arbitration is triggered by a data packet arriving at one of the input storage areas) and never selects any of the multiplexer inputs as an output if output queue 80 is full.

Data packets output by multiplexer 74 are enqueued in entries within output queue 80, which in the depicted embodiment is a first-in, first-out (FIFO) queue. During each clock cycle, the data packet stored in the bottom entry of output queue 80 is available to be removed from output queue 80 and either sourced onto local interconnect 16, discarded, or stored in recirculation queue 72 in response to signals generated by decision point logic 82. As indicated, decision point logic 82 determines if the data packet in the bottom entry of output queue 80 should be removed and, if so, the destination of the data packet (i.e., local interconnect 16, discarded, or recirculation queue 72), in response to recirculation queue full signal 90, output queue empty signal 92, and address control logic signals 94 received from transaction send unit 42. As discussed above with respect to mux arbitration logic 78, decision point logic 82 can implement any of a number of decision point algorithms, all of which prevent data from being routed to recirculation queue 72 if recirculation queue 72 is full and do not instruct output queue 80 to output a data packet if output queue 80 is empty. In a preferred embodiment, decision point logic 82 only removes a data packet from output queue 80 for transmission on local interconnect 16 or discard in response to an explicit command transmitted as part of address control logic signals 94. If a data packet cannot be removed from output queue 80 in response to an explicit command, the data packet is said to have stalled. Such stalls may be due to any number of factors, including the current inability of the intended recipient of a data packet to currently process the data packet, the latency of decision point logic 82, the latency of transaction send unit 42, etc. Because output queue 80 is a FIFO queue, the stall of a data packet at the bottom entry of output queue 80 can delay the transmission of subsequent data packets.

Decision point logic 82 can be designed to handle stalls in at least two ways. First, decision point logic 82 may default to a mode in which a data packet is automatically removed from output queue 80 and recirculated to recirculation queue 72 after a data packet has stalled in the bottom entry of output queue 80 for a selected number of cycles. Alternatively, decision point logic 82 may default to a mode in which a stalled data packet is not removed from output queue 80 and recirculated to output queue 72 until an explicit instruction is received from transaction send unit 42. In either case, once a data packet has been recirculated, the data packet is stored in the top of recirculation queue 72, which is also preferably implemented as a FIFO queue. By recirculating a stalled data packet in this manner, subsequent data packets in output buffer 80 can be transmitted on local interconnect 16 with minimal delay, and the recirculated data packet will eventually vie with data packets in input buffers 70 for re-admission to output buffer 80. The priority of recirculated data packets vis-a-vis data packets in input buffers 70 is preferably selected based upon how long the recirculated data packets should be delayed before again being presented for selection by decision point logic 82.

It should be understood that the exemplary embodiment depicted in FIG. 3 is only one embodiment of the present invention and that other embodiments of the present invention that also permit the recirculation of stalled data are possible. For example, in alternative embodiments of the present invention, the data recirculation apparatus may include multiple output queues, may recirculate data to input buffers and eliminate a dedicated recirculation queue, or may contain multiple recirculation queues. In such alternative embodiments, the algorithms implemented by mux arbitration logic 78 and decision point logic 82 will be tailored to the structure present in each embodiment and may entail additional complexity.

As has been described, the present invention provides a method and apparatus for recirculating data in a data processing system in order to minimize the latency attributable to stalls at the output stage of a communication pipeline. In accordance with the present invention, data stalled in an output buffer of a data recirculation apparatus can be recirculated to an input storage area in order to permit other data to be transmitted over an interconnect. The present invention may be advantageously applied to the transmission of data packets via a split transaction interconnect, particularly in embodiments in which the communication protocol governing communication on the interconnect does not permit data retry responses to data packets. However, it should be understood that the present invention is not limited to such embodiments and is applicable to other data processing systems and the communication of any other data types, including addresses, coherency responses, etc.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a data recirculation apparatus, comprising:

a FIFO output buffer from which data are output onto an interconnect;

a plurality of input storage areas from which data are selected for storage within said FIFO output buffer;

a multiplexer that selects data from said plurality of input storage areas for storage within said FIFO output buffer in response to a select signal generated by a mux arbitration logic; and buffer control logic, coupled to said FIFO output buffer, which in response to a determination that a particular datum has stalled in said FIFO output buffer, automatically causes said particular datum to be removed from said FIFO output buffer and stored in one of said plurality of input storage areas, such that a subsequent datum in said FIFO output buffer can be transmitted onto said interconnect.

2. The data recirculation apparatus of claim 1, said plurality of input storage areas including a recirculation buffer, wherein all data removed from said output buffer and stored in one of said plurality of input storage areas are stored in said recirculation buffer.

3. The data recirculation apparatus of claim 1, wherein said buffer control logic automatically removes said particular datum from said output buffer and stores said particular datum in one of said plurality of input storage areas in response to said particular datum stalling in said output buffer.

4. The data recirculation apparatus of claim 1, wherein said buffer control logic automatically removes said particular datum from said output buffer and stores said particular datum in one of said plurality of input storage areas in response to a signal.

5. The data recirculation apparatus of claim 1, wherein said output buffer is a multiple-entry first-in, first-out (FIFO) queue.

6. A data processing system, comprising:

an interconnect; and a first processing node and a second processing node coupled to said interconnect for communication, wherein said second processing node includes a data recirculation apparatus, said data recirculation apparatus including:

a FIFO output buffer from which data are output onto said node interconnect;

a plurality of input storage areas from which data are selected for storage within said FIFO output buffer;

a multiplexer that selects data from said plurality of input storage areas for storage within said FIFO output buffer in response to a select signal generated by a mux arbitration logic; and buffer control logic, coupled to FIFO output buffer, which in response to a determination that a particular datum has stalled in said buffer, automatically causes said particular datum to be removed from said FIFO output buffer and stored in one of said plurality of input storage areas, such that a subsequent datum in said FIFO output buffer can be transmitted onto said node interconnect.

7. The data processing system of claim 6, said plurality of input storage areas including a recirculation buffer, wherein all data removed from said output buffer and stored in one of said plurality of input storage areas are stored in said recirculation buffer.

8. The data processing system of claim 6, wherein said buffer control logic automatically removes said particular datum from said output buffer and stores said particular datum in one of said plurality of input storage areas in response to said particular datum stalling in said output buffer.

9. The data processing system of claim 6, wherein said buffer control logic automatically removes said particular datum from said output buffer and stores said particular datum in one of said plurality of input storage areas in response to a signal.

10. The data processing system of claim 6, wherein said output buffer is a multiple-entry first-in, first-out (FIFO) queue.

11. A method of data recirculation in a data processing system, said method comprising:

selecting data for storage in a FIFO output buffer from among data stored in a plurality of input storage areas, in response to a select signal generated by a mux arbitration logic;

selectively removing data from said FIFO output buffer and transmitting said removed data via an interconnect; and in response to a particular datum stalling in said FIFO output buffer, automatically removing said particular datum from said FIFO output buffer and storing said particular datum in one of said plurality of input storage areas, such that a subsequent datum in said FIFO output buffer can be transmitted onto said interconnect.

12. The method of claim 11, said plurality of input storage areas including a recirculation buffer, wherein all data removed from said output buffer and stored in one of said plurality of input storage areas are stored in said recirculation buffer.

13. The method of claim 11, wherein selectively removing data from said output buffer and transmitting said removed data via an interconnect comprises selectively removing data from said output buffer and transmitting said removed data via and interconnect in response to a command.

14. The method of claim 11, wherein removing said particular datum from said output buffer and storing said particular datum in one of said plurality of input storage areas comprises removing said particular datum from said output buffer and storing said particular datum in one of said plurality of input storage areas in response to receipt of a command.

15. The method of claim 11, wherein selectively removing data from said output buffer and transmitting said removed data via an interconnect includes removing data from said output buffer in order of receipt by said output buffer.

16. The data recirculation apparatus of claim 1, wherein during each selection said multiplexer can select data from any of said plurality of input storage areas then holding data.

17. The data processing system of claim 6, wherein during each selection said multiplexer can select data from any of said plurality of input storage areas then holding data.

18. The data processing system of claim 6, wherein:

said data processing system is a non-uniform memory access data processing system;

said first and second processing nodes each contain a respective local memory; and said second processing node includes a local interconnect to which said data recirculation apparatus is coupled such that data is communicated between said node interconnect and said local interconnect via said data recirculation apparatus.

* * * * *